United States Patent [19]

Sullivan et al.

[11] Patent Number: 4,541,853
[45] Date of Patent: Sep. 17, 1985

[54] APPARATUS FOR PRODUCING GLASS FIBERS

[75] Inventors: Timothy A. Sullivan, Newark, Ohio; Gregory L. Morgan, Jackson, Tenn.; Arthur S. Warner, Hebron, Ohio

[73] Assignee: Owens-Corning Fiberglas Corporation, Toledo, Ohio

[21] Appl. No.: 657,110

[22] Filed: Oct. 2, 1984

[51] Int. Cl.$^4$ ............................................. C03B 37/085
[52] U.S. Cl. ....................................................... 65/12
[58] Field of Search ............................. 65/1, 2, 12, 356

[56] References Cited

U.S. PATENT DOCUMENTS

| | | | |
|---|---|---|---|
| 2,908,036 | 10/1959 | Russell | 65/12 |
| 3,328,144 | 6/1967 | Glaser | 65/12 X |
| 3,647,382 | 3/1972 | Tilbrook | 65/12 |
| 3,997,309 | 12/1976 | Harriss | 65/12 |
| 4,018,586 | 4/1977 | Cates et al. | 65/2 |
| 4,330,311 | 5/1982 | Jensen | 65/1 |
| 4,332,602 | 6/1982 | Jensen | 65/12 |

Primary Examiner—Robert Lindsay
Attorney, Agent, or Firm—Ronald C. Hudgens; Greg Dziegielewski

[57] ABSTRACT

Apparatus for the production of glass filaments is provided comprising a feeder for supplying streams of molten glass to be attenuated into filaments, means for attenuating the streams into filaments and an environmental control means adapted to remove heat from the fiber forming region comprised of a plurality of fin-like members positioned between the streams of molten glass being attenuated into filaments, the first end of said members being permanently secured to a first cooling manifold and the second end of said members being releasably positioned within tapered notches in a second manifold.

3 Claims, 3 Drawing Figures

APPARATUS FOR PRODUCING GLASS FIBERS

TECHNICAL FIELD

The invention disclosed herein relates to an improved environmental control means for removing heat from the zone of attenuation in the production of glass fibers.

BACKGROUND

The use of an environmental control means comprised of a plurality of fin-like members secured to a water-cooled manifold is well-known in the art. For example, see U.S. Pat. No. 2,908,036 issued to Robert G. Russell. The Russell patent discloses that the fin-like members may be cantilevered from one water-cooled manifold, a "single manifold" system, or may be secured at each end to a pair of such manifolds, a "dual manifold" system.

When operating the "single manifold" fin system, the temperature of the fin at the distal end is generally greater than the temperature of the fin near the manifold. Notwithstanding the more severe temperature gradient or differential across the length of the fin, the "single manifold" fin system has been much more widely used than the known "dual manifold" type of fin system wherein the fins are permanently attached to individual cooling manifolds at each end.

The "single manifold" system is much more broadly utilized because of the difficulties in replacing and/or maintaining the permanently attached "dual-type" fin systems as compared to the "single manifold" fin systems.

The present invention provides a system wherein the reduced temperature gradient is provided with a pair of water-cooled manifolds but without the associated problems of previous "dual manifold" cooling systems.

DISCLOSURE OF THE INVENTION

This invention pertains to cooling system apparatus associated with glass fiber forming systems wherein fin-like cooling members are permanently secured to a first manifold at one end and are slidably positioned within notches or grooves of a particular configuration of a second cooling manifold at the opposite end.

BEST MODE OF CARRYING OUT THE INVENTION

Figure 1:
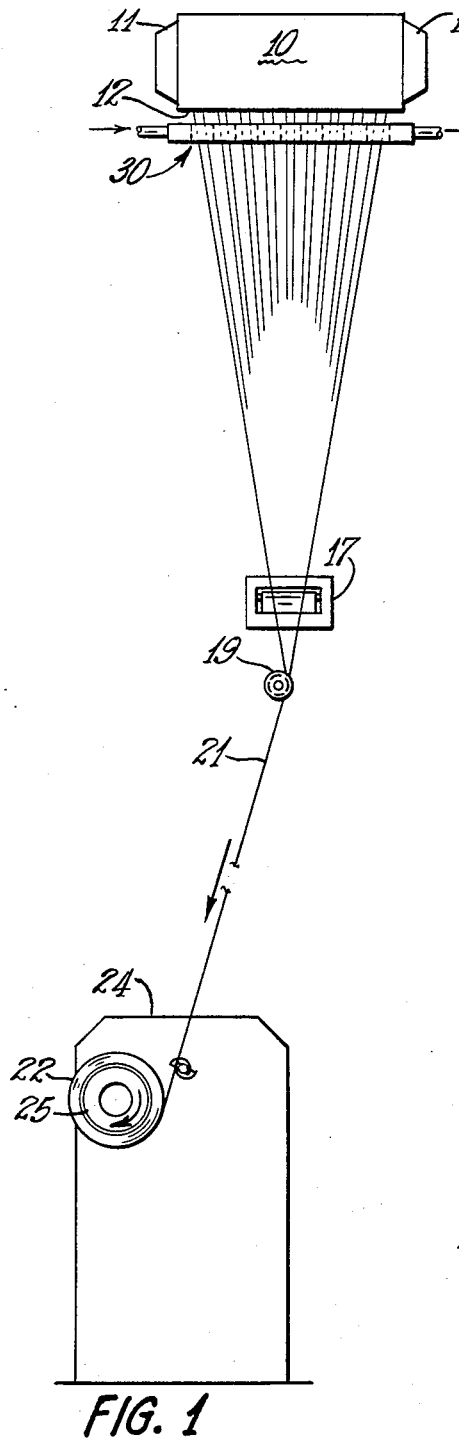
FIG. 1 is a semi-schematic elevational view of a fiber forming position employing the environmental control means according to the principles of this invention.

As shown in the drawings, orificed discharge wall 12 of feeder 10 is adapted to supply a plurality of molten glass streams to be attenuated into a plurality of filaments 15. Feeder 10 includes a pair of terminals 11 which are adapted to be connected to a source of electrical energy (not shown) to resistively heat feeder 10, as is known in the art.

As shown in FIG. 1, the streams of molten inorganic material, such as glass, are drawn into filaments 15 through the action of winder 24. However, it is to be understood that any other suitable attenuative system may be employed in the place of winder 24.

As is known in the art, coating applicator 17 applies a protective coating or sizing material to the advancing filaments 15, and gathering means or shoe 19 collects the filaments 15 into a strand 21 which is wound into a package 22 on the rotating collet 25 of winder 24.

Figure 2:
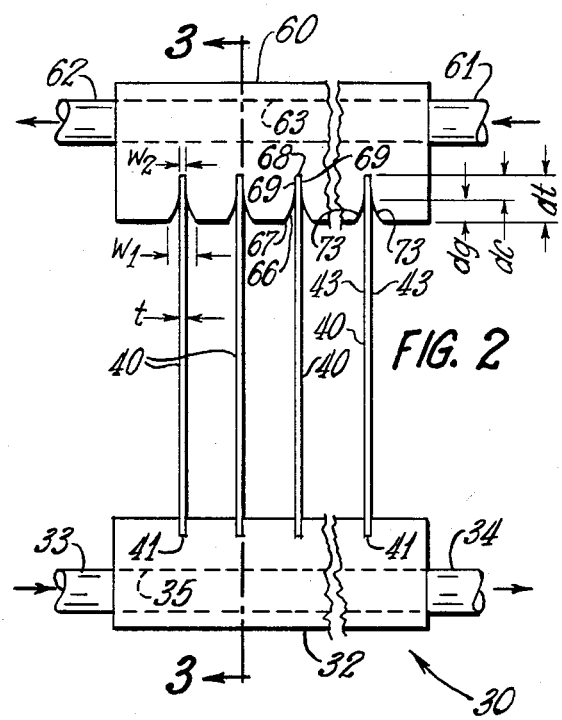
FIG. 2 is a plan view of the environmental control means according to the principles of this invention.
Figure 3:
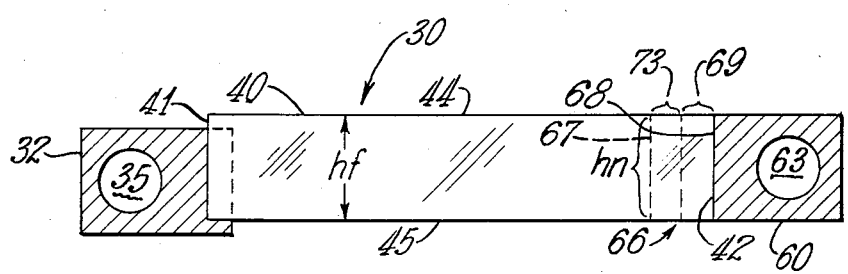
FIG. 3 is a sectional view of the environmental control means shown in FIG. 2 taken along view 3—3.

As shown in FIGS. 2 and 3, environmental control means 30 is comprised of a first manifold 32, a second manifold 60 and a plurality of fin-like members 40 extending therebetween and is positioned at the zone filament attenuation to cool the streams of molten glass to facilitate the formation of filaments. As such, the fin-like members extend between the streams of molten glass and filaments, as is known in the art.

According to the principles of this invention, the first end 41 of fin-like members 40 is permanently secured to a side of first manifold 32 by any suitable means such as soldering or welding as is known in the art, and the second end 42 of each fin-like member 40 is positioned within one of the plurality of notches 66 in second manifold 60. As such, the ends 42 of fin-like members 40 are merely in contact with second manifold 60 within the notches or grooves 66 therein rather than being permanently secured thereto.

This permits the fin-like members to be replaced, adjusted or maintained without disrupting or breaking the glass streams or filaments being produced which would be impossible to do if fin-like members 40 were permanently secured to both the first manifold 32 and second manifold 60. Yet, such "contact" with the second manifold 60 increases the rate of heat transfer out of the fiber forming zone through the fins 40 and reduces the temperature differential over the length of the fin, as compared to a "single manifold" system.

First manifold 32 includes an inlet 33 and an outlet 34 to supply cavity 35 with a flow of cooling fluid, such as water, as is known in the art. Similarly, second manifold 60 includes an inlet 61 and an outlet 62 to supply cavity 63 with a flow of water. Manifolds 32 and 60 may be connected in series or in parallel with respect to the water flow according to the principles of this invention, but it is desirable that each manifold be connected to its own source of cooling water with the flow of water being in opposite directions as shown in FIG. 2. Generally, such manifolds are positioned to extend along the length or width of the fiber forming zone.

According to the principles of this invention, notches or grooves 66 in second manifold 60 have a tapered entrance 67 leading to a relatively deep but narrow lateral wall 69 section for contact with a side 43 of second end 42 of fin-like member 40 to increase the rate of heat transfer between fin-like member and second manifold, as compared to that system shown in concurrently filed U.S. patent application Ser. No. 657,109 filed on Oct. 2, 1984 in the names of Timothy A. Sullivan and Gregory L. Morgan, which is incorporated herein by reference.

As shown, the width "$w_1$" of each notch 66 at entrance 67 is greater than or equal to 1.5 times the thickness "$t$" of fin-like member 40 and is preferably about twice the thickness "$t$" of member 40. It would be desirable to have the second end 42 of member 40 be a "snug" or pressed fit between the lateral walls or surfaces 69 of notches 66 for maximum heat conduction from both sides 43 of second end 42 of member 40 into second manifold 60. However, in practice, the width "$w_2$", that is the space or distance between lateral surfaces 69 of notch 66, is slightly greater than the thickness "t" of a fin-like member 40 to permit a sliding fit therebetween.

Intimate contact between one side 43 of member 40 and one of the lateral walls 69 is provided by biasing fin-like member 40 towards one side of the notch or the other by slightly bending the fin 40, if necessary.

As shown, the total depth "$d_t$" of notch 66 is greater than or equal to about 0.5 times the height "$h_f$" of a fin-like member 40. Preferably, the depth of the straight or lateral surfaces 69 or depth of contact surfaces 69 "$d_c$" is greater than or equal to one-third of the height "$h_f$" of a fin member 40.

Thus, the depth "$d_g$" of the tapered section 73 of notch 66 is sufficient to permit the fin-like members 40 to be relatively easily guided into the bottom of each notch 66. As shown, the depth of the groove or tapered section 73 is approximately equal to the depth of the straight section 69. As shown the walls of tapered section 73 are radiused or curved, but such walls are preferably straight (angled) for ease of fabrication.

As can be seen in FIG. 3, the height "$h_f$" of fin-like member 40 is substantially equal to the height "$h_n$" of notches 66 as well as manifolds 32 and 60.

As shown, the upper edge 44 and lower edge 45 of fin-like member 40 is substantially flush with the upper and lower surface of second manifold 60. That is, the second end 42 of fin-like member 40 is located totally within the notch 66 of second manifold 60 for the most effective transfer of heat from member 40 to manifold 60; however other arrangements are possible.

For ease of mounting, the first end 41 of fin-like member 40 is positioned slightly offset with regard to first manifold 32. It is to be understood, however, that other arrangements, such as flush mounting for the first end, are within the scope of the instant invention. Environmental control means 30, especially fins 40, should not contact the metal of feeder 10.

Thus, according to the principles of this invention, the temperature gradient along the length of each fin-like member 40 is substantially similar to previous "permanently attached dual manifold" fin system and yet provides for ease of replacement and maintenance heretofore not possible with such "dual manifold" systems. The contact by second end 42 with second manifold 60 substantially reduces the temperature of the fin-like member at that point as compared to a "single manifold" system, especially with wide fiber forming feeders. The reduced temperature gradient or differential over the length of the fin is important in achieving satisfactory performance in the production of glass fibers.

It is apparent that, within the scope of the invention, modifications and different arrangements can be made other than as herein disclosed. The present disclosure is merely illustrative with the invention comprehending all variations thereof.

INDUSTRIAL APPLICABILITY

The invention described herein is readily applicable to the glass fiber industry.

We claim:

1. Apparatus for producing glass filaments comprising
   a feeder for supplying streams of molten glass to be attenuated into filaments,
   means for attenuating the streams into filaments, and
   an environmental control means adapted to remove heat from the fiber forming region comprised of a plurality of fin-like members positioned between the streams of molten glass being attenuated into filaments, the first end of said members being permanently secured to a first cooling manifold and the second end of said members being releasably positioned within notches in said second manifold wherein said notches have a tapered entrance section leading to a contact section to contact at least one side of said fin-like members at said second end.

2. The apparatus of claim 1 wherein said contact section and said second end of the fin-like member are configured for a sliding fit therebetween.

3. The apparatus of claim 1 wherein the width of said contact section is greater than or equal to 0.33 times the height of one said fin-like member.

* * * * *